(12) United States Patent
Zhang

(10) Patent No.: US 11,206,376 B2
(45) Date of Patent: Dec. 21, 2021

(54) SYSTEMS AND METHODS FOR IMAGE PROCESSING

(71) Applicant: ZHEJIANG DAHUA TECHNOLOGY CO., LTD., Zhejiang (CN)

(72) Inventor: Lunqi Zhang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/891,085

(22) Filed: Jun. 3, 2020

(65) Prior Publication Data
US 2020/0336710 A1  Oct. 22, 2020

Related U.S. Application Data

(63) Continuation of application No. PCT/CN2018/113626, filed on Nov. 2, 2018.

(51) Int. Cl.
| | |
|---|---|
| *H04N 7/18* | (2006.01) |
| *H04N 5/232* | (2006.01) |
| *G06K 9/00* | (2006.01) |
| *H04N 5/247* | (2006.01) |

(52) U.S. Cl.
CPC .......... *H04N 7/188* (2013.01); *G06K 9/00744* (2013.01); *G06K 9/00771* (2013.01); *H04N 5/23296* (2013.01); *H04N 5/23299* (2018.08); *H04N 5/247* (2013.01); *H04N 7/181* (2013.01)

(58) Field of Classification Search
CPC .......... G06K 9/00744; G06K 9/00771; H04N 5/23296; H04N 5/23299; H04N 5/247; H04N 7/181; H04N 7/188

USPC ...... 348/159, 169, 36, 143, 240.99; 382/103
See application file for complete search history.

(56) References Cited

U.S. PATENT DOCUMENTS

| | | |
|---|---|---|
| 6,215,519 B1 | 4/2001 | Nayar et al. |
| 8,456,528 B2 | 6/2013 | Brown et al. |
| 9,240,051 B2 | 1/2016 | Liu et al. |
| 9,363,487 B2 | 6/2016 | Chosak et al. |

(Continued)

FOREIGN PATENT DOCUMENTS

| | | |
|---|---|---|
| CN | 101707671 A | 5/2010 |
| CN | 101930609 A | 12/2010 |

(Continued)

OTHER PUBLICATIONS

International Search Report in PCT/CN2018/113626 dated Jan. 30, 2019, 4 pages.

(Continued)

*Primary Examiner* — Thai Q Tran
*Assistant Examiner* — Stephen R Smith
(74) *Attorney, Agent, or Firm* — Metis IP LLC

(57) ABSTRACT

A method for image acquisition may include receiving a video from a first video camera in a period, the video including a first view of a scene. The method may also include delineating a plurality of first regions within the first view of the scene. The method may further include determining an accumulated effect of at least one feature occurring within the period within at least one of the plurality of first regions. The method may further include directing a second video camera towards a second view of the scene based on the accumulated effect.

18 Claims, 14 Drawing Sheets

(56) References Cited

U.S. PATENT DOCUMENTS

| | | | |
|---|---|---|---|
| 9,412,269 B2 | 8/2016 | Saptharishi et al. | |
| 2011/0310219 A1* | 12/2011 | Kim | H04N 5/247 |
| | | | 348/36 |
| 2016/0307424 A1* | 10/2016 | Mills | G06K 9/00771 |

FOREIGN PATENT DOCUMENTS

| | | |
|---|---|---|
| CN | 102148965 A | 8/2011 |
| CN | 102355576 A | 2/2012 |
| CN | 103198487 A | 7/2013 |
| CN | 206042209 U | 3/2017 |
| CN | 107213635 A | 9/2017 |
| WO | 2012151777 A1 | 11/2012 |
| WO | 2019109764 A1 | 6/2019 |

OTHER PUBLICATIONS

Written Opinion in PCT/CN2018/113626 dated Jan. 30, 2019, 5 pages.
The Extended European Search Report in European Application No. 18885279.2 dated Jul. 22, 2020, 10 pages.

\* cited by examiner

600

┌─────────────────────────────────────────────┐
Determining a total count of the at least one feature   610
of the candidate active region based on the count of
the at least one feature of each candidate first region
included in the candidate active region
└─────────────────────────────────────────────┘
                     ↓
┌─────────────────────────────────────────────┐   620
Comparing the total count of the at least one feature
of the candidate active region with a third threshold
└─────────────────────────────────────────────┘
                     ↓
┌─────────────────────────────────────────────┐   630
Identifying the candidate active region as the active
region based on a comparison result that the total
count of the at least one feature of the candidate
active region is greater than the third threshold
└─────────────────────────────────────────────┘

FIG. 6

SYSTEMS AND METHODS FOR IMAGE PROCESSING

CROSS-REFERENCE TO RELATED APPLICATIONS

The present application is a continuation of International Application No. PCT/CN2018/113626, filed on Nov. 2, 2018, which claims priority of Chinese Application No. 201711297779.8, filed on Dec. 8, 2017, the entire contents of which are incorporated herein by reference in entirety.

TECHNICAL FIELD

The present disclosure generally relates to the field of electronic technology, and more particularly, relates to systems and methods for acquiring images.

BACKGROUND

A wide-angle camera (hereinafter referred to as "box camera") may acquire images in a large field-of-view (FOV) angle with limited resolution. It is difficult for the box camera to acquire images with especially high resolution. In contrast, a dome camera (hereinafter referred to as "dome camera") may acquire images with high resolution, but with smaller FOV angle. Accordingly, a combination of the box camera and the dome camera may be employed to acquire the images as needed. For example, a box camera, which captures images in a large FOV angle, may be used to determine a target object within the large FOV angle. Then a dome camera may be used to capture a clearer image of the target object in a smaller FOV angle.

To direct the dome camera to capture the clearer image of the target object, a user may manually set several parameters for the dome camera to perform image acquisition. Alternatively, the user may manually select a region within the large FOV angle of the box camera and use the dome camera to perform image acquisition in the region. However, the process mentioned above may require extra operation of a user, which leads to low efficiency and poor accuracy, and the target object cannot be monitored or captured timely or accurately.

SUMMARY

According to an aspect of the present disclosure, a system for image acquisition is provided. The system may include at least one storage medium storing a set of instructions and at least one processor configured to communicate with the at least one storage medium. When executing the set of instructions, the at least one processor may be directed to cause the system to receive a video from a first video camera in a period, the video including a first view of a scene. The at least one processor may be further directed to cause the system to delineate a plurality of first regions within the first view of the scene. The at least one processor may be further directed to cause the system to determine an accumulated effect of at least one feature occurring within the period within at least one of the plurality of first regions. The at least one processor may be further directed to cause the system to direct a second video camera towards a second view of the scene based on the accumulated effect. In some embodiments, the at least one processor may be further directed to cause the system to control the second video camera to capture video according to the second view of the scene, wherein the second view of the scene provides a closer view than the first view based on a different level of zoom of the second video camera compared to the first video camera.

In some embodiments, to determine the accumulated effect of at least one feature, the at least one processor may be further directed to cause the system to generate a count of the at least one feature that occurs in the period within at least one of the plurality of first regions.

In some embodiments, to delineate a plurality of first regions within the first view of the scene, the at least one processor may be further directed to cause the system to delineate the plurality of first regions based on a resolution of the video.

In some embodiments, to generate the count of the at least one feature that occurs in the period within at least one of the plurality of first regions, the at least one processor may be further configured to, for each of the plurality of first regions, for every predetermined time interval in the period, identify whether the at least one feature occurs within the first region. The at least one processor may be further directed to cause the system to generate the count of the at least one feature that occurs within the first region based on the plurality of identifications of whether the at least one feature occurs within the first region.

In some embodiments, to direct the second video camera towards a second view of the scene based on the accumulated effect, the at least one processor may be further configured to cause the system to determine a plurality of candidate first regions based on the plurality of accumulated effects of the plurality of first regions. The at least one processor may be further directed to cause the system to identify at least one active region based on the plurality of candidate first regions. The at least one processor may be further directed to cause the system to direct the second video camera towards the second view of the scene based on the at least one active region.

In some embodiments, to determine the plurality of candidate first regions based on the plurality of accumulated effects of the plurality of first regions, the at least one processor may be further directed to cause the system to, for each of the plurality of first regions, compare the count of the at least one feature of the first region with a first threshold. The at least one processor may be further directed to cause the system to determine the first region as a candidate first region based on a comparison result that the count of the at least one feature of the first region is greater than the first threshold.

In some embodiments, to identify the at least one active region based on the plurality of candidate first regions, the at least one processor may be further directed to cause the system to cluster the plurality of candidate first regions into at least one candidate active region. The at least one processor may be further directed to cause the system to, for each of the at least one candidate active region, determine a feature density of the candidate active region based on a number of candidate first regions included in the candidate active region and a number of first regions included in the candidate active region. The at least one processor may be further directed to cause the system to compare the feature density of the candidate active region with a second threshold. The at least one processor may be further directed to cause the system to identify the candidate active region as the active region based on a comparison result that the feature density of the candidate active region is greater than the second threshold.

In some embodiments, for each of the at least one candidate active region, the at least one processor may be further directed to cause the system to determine a total count of the at least one feature of the candidate active region based on the count of the at least one feature of each candidate first region included in the candidate active region. The at least one processor may be further directed to cause the system to compare the total count of the at least one feature of the candidate active region with a third threshold. The at least one processor may be further directed to cause the system to identify the candidate active region as the active region based on a comparison result that the total count of the at least one feature of the candidate active region is greater than the third threshold.

In some embodiments, the at least one processor may be further directed to cause the system to determine an active degree for each of the at least one active region. The at least one processor may be further directed to cause the system to determine a group of active regions based on the active degree of each of the at least one active region, wherein the active degree corresponding to each of the active regions in the group is greater than any of active degrees of the at least one active region not included in the group. The at least one processor may be further directed to cause the system to direct the second video camera towards at least one second view according to the group of active regions.

In some embodiments, to direct the second video camera towards at least one second view according to the group of active regions, the at least one processor may be further directed to cause the system to rank the group of active regions based on the active degree of each active region included in the group. The at least one processor may be further directed to cause the system to determine a sequence for the group of active regions based on the ranking. The at least one processor may be further directed to cause the system to direct the second video camera based on the sequence.

According to another aspect of the present disclosure, a method for image acquisition is provided. The method may include receiving a video from a first video camera in a period, the video including a first view of a scene. The method may also include delineating a plurality of first regions within the first view of the scene. The method may further include determining an accumulated effect of at least one feature occurring within the period within at least one of the plurality of first regions. The method may still include directing a second video camera towards a second view of the scene based on the accumulated effect.

According to still another aspect of the present disclosure, a system for image acquisition is provided. The system may include at least one storage medium storing a set of instructions and at least one processor configured to communicate with the at least one storage medium. When executing the set of instructions, the at least one processor may be directed to cause the system to receive a video from a first video camera in a period, the video including a first view of a scene. The at least one processor may be further directed to cause the system to delineate a plurality of first regions within the first view of the scene. The at least one processor may be further directed to cause the system to determine an accumulated effect of at least one feature occurring within the period within at least one of the plurality of first regions. The at least one processor may be further directed to cause the system to direct a second video camera towards a second view of the scene based on the accumulated effect.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating another exemplary process of identifying an active region according to some embodiments of the present disclosure;

DETAILED DESCRIPTION

Figure 1:
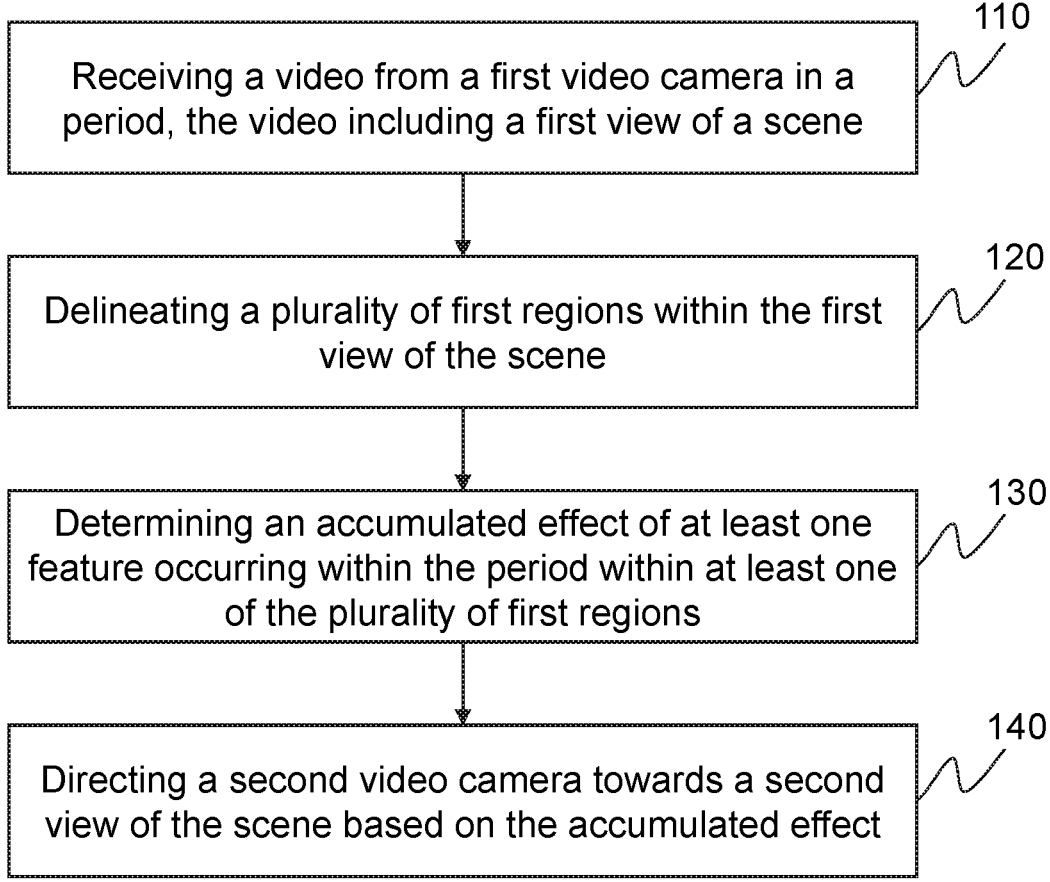
FIG. 1 is a flowchart illustrating an exemplary process of image acquisition according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The present disclosure relates to systems and methods of image acquisition. The methods may be implemented on a computing device. The computing device may have at least one processor (e.g., the processor 1910 shown in FIG. 19) and at least one computer-readable storage medium (e.g., the storage 1920 in FIG. 19). In some embodiments, a processor may receive a video from a first image capturing device (e.g. a wide-angle camera) in a period, determine one or more active regions based on the received video, and direct a second image capturing device (e.g. a dome camera) towards the one or more active regions to capture the one or more active regions.

In some embodiments, the first image capturing device or the second image capturing device may include a digital camera, a video camera, a surveillance camera, a web camera, a smartphone, a tablet, a laptop, a video gaming console equipped with a web camera, a camera with multiple lenses, etc. The wide-angle camera in the present disclosure may be a charge-coupled device (CCD) camera. The wide-angle camera may have the shape of a cuboid to obtain images (e.g., surveillance images) covering a large FOV angle. The dome camera in the present disclosure may include an integrated camera, a high-speed stepping motor PTZ, an embedded decoder board, other electronic devices, and a dome camera shield-mounting bracket. The integrated camera may be mounted on the high-speed stepping motor PTZ and controlled to rotate up and down, left and right under the control of a control end, to achieve the scenario cruise monitoring effect.

As used herein, an "active region" may refer to a region in which a count or a density of at least one feature reaches to a threshold. The at least one feature may include people, vehicles, animals, or the like.

In some embodiments of the present disclosure, after a processor receives a video including a first view of a scene in the period, the processor may delineate a plurality of first regions (also referred to as "unit regions") within the first view of the scene. The processor may generate a count of the at least one feature that occurs in the period within at least one of the plurality of unit regions. Then, the processor may compare the count of the at least one feature of a unit region with a first threshold, and determine the unit region as a candidate unit region if the count of the at least one feature of the unit region is greater than the first threshold. Further, the processor may cluster the plurality of candidate unit regions into at least one candidate active region, and determine a feature density and/or a total count for each of the at least one candidate active region. Based on the feature density and/or the total count for each of the least one candidate active region, the processor may identify one or more active regions and direct a second video camera towards the view of the scene of the one or more active regions. In some embodiments, the second video camera may be a dome camera.

Hereinafter, some embodiments of the present disclosure will be further described in connection with the drawings.

FIG. 1 is a flowchart illustrating an exemplary process 100 of image acquisition according to some embodiments of the present disclosure.

In 110, a processor may receive a video from a first video camera in a period. The video may include a first view of a scene. In some embodiments, the first video camera may be a wide-angle camera, or any camera device with a wide-angle lens. For example, the first video camera may be a surveillance camera with a wide-angle lens. In some embodiments, the period may be a value preset by a user or predetermined by the processor. For example, the user may preset the period to be 5 minutes, 10 minutes, 30 minutes, etc. In some embodiments, the period may vary with time. For example, the processor may predetermine the period to be 30 minutes in daytime, and 2 hours in nighttime.

In 120, the processor may delineate a plurality of first regions within the first view of the scene. The first region may be a unit region included in the view of the scene corresponding to the video from the first video camera. The plurality of first regions may have a same size or different sizes. In some embodiments, the processor may delineate the plurality of first regions within the first view of the scene based on a resolution of the video. For example, assuming that the resolution of the video may correspond to the size of pixels in each frame image in the video when the size of the frame image is fixed. A higher resolution of the video may correspond to a smaller size of each pixel. If the first region has a fixed number of pixels, the smaller size of each pixel may lead to a smaller size of the first region.

In 130, the processor may determine an accumulated effect of at least one feature occurring within the period within at least one of the plurality of first regions. In some embodiments, the at least one feature may be associated with an object (e.g., people, vehicles, animals, or the like, or any combine thereof) in each of the plurality of first regions. The accumulated effect may be a count of the at least one feature within each of the plurality of first regions. For example, for each first region, the processor may identify the vehicles entered into the first region and determine the count of the whole vehicles that have appeared in the first region within the period.

In 140, the processor may direct a second video camera towards a second view of the scene based on the accumulated effect. In some embodiments, the processor may determine one or more active regions based on the accumulated effect. The processor may direct the second video camera towards the second view of the scene according to the one or more active regions. Then, the processor may further control the second video camera to capture a video according to the second view of the scene. In some embodiments, the second view of the scene may provide a closer view than the first view based on a different level of zoom of the second video camera compared with the first video camera.

It should be noted that the above description regarding the process 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 2:
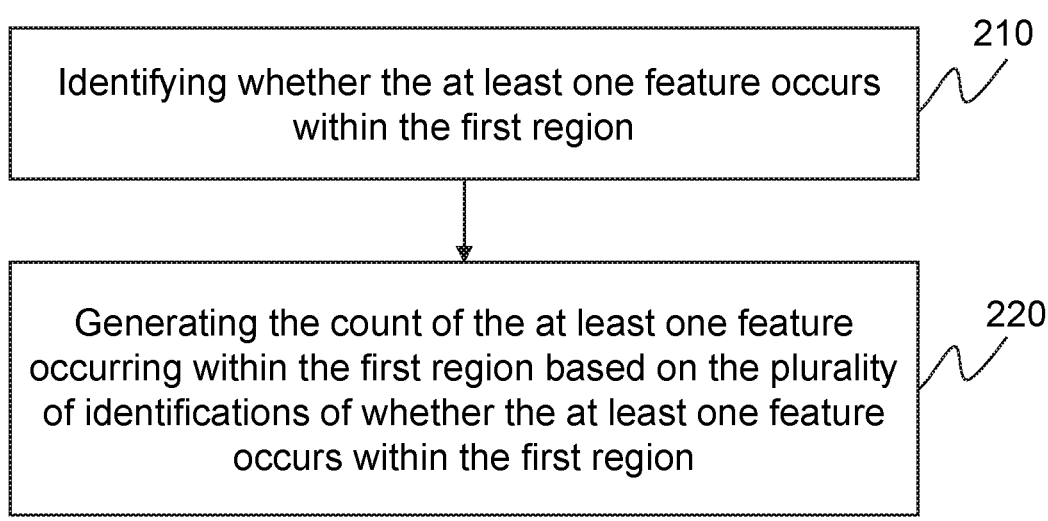
FIG. 2 is a flowchart illustrating an exemplary process of generating a count of at least one feature occurs within a first region according to some embodiments of the present disclosure.

FIG. 2 is a flowchart illustrating an exemplary process 200 of generating a count of at least one feature occurring within the first region according to some embodiments of the present disclosure. In some embodiments, the operation 130 may be performed according to the process 200.

In 210, a processor may identify whether the at least one feature occurs within the first region. In some embodiments, the at least one feature may be an appearance of an animal, such as a cat. The processor may identify whether the animal appears in the first view of the scene. If the animal appears in the first view of the scene, the processor may determine a plurality of first regions in which the animal appears. In some embodiments, the at least one feature may be the appearances of people, vehicles and/or animals in the plurality of first regions. Different people, vehicles and/or animals may appear in different first regions. For each of the at least one feature, the processor may identify the plurality of first regions in which the at least one feature appears. For each of the plurality of first regions, the processor may identify people, vehicles and/or animals appeared in the first region.

In 220, the processor may generate the count of the at least one feature occurring within the first region based on the plurality of identifications of whether the at least one feature occurs within the first region. In some embodiments, for each of the first region, when the processor identifies a feature occurring in the first region, the count of the feature within the first region may increase by one. The processor may generate the count of the at least one feature occurring within the first region by adding up all the features occurring within the first region in a period. For example, in 30 minutes, two people, five vehicles, and one cat appears in a first region A. The processor may determine the count of first region A to be 8.

Figure 15:
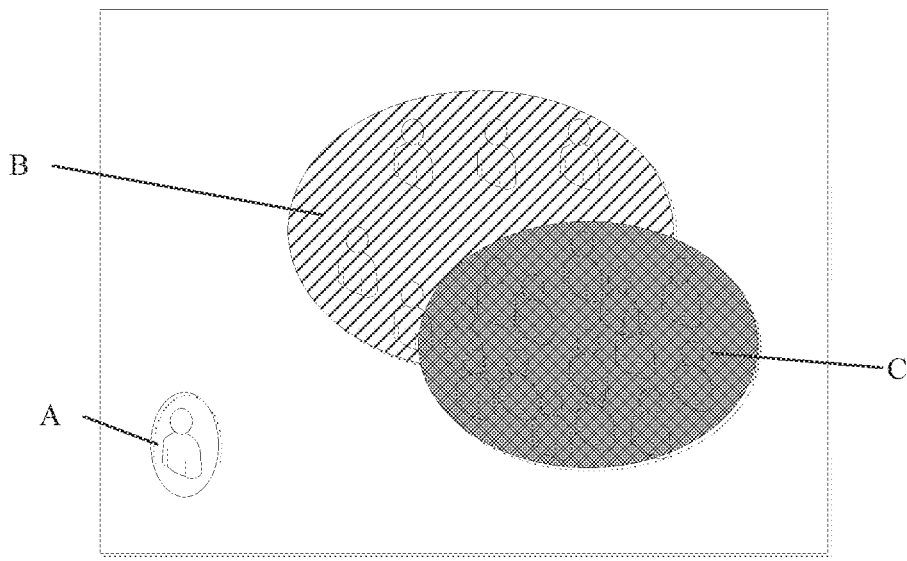
FIG. 15 is a schematic diagram illustrating an exemplary hot map with a plurality of regions according to some embodiments of the present disclosure.

In some embodiments, the processor may generate heat map images for the video including the first view of scene, e.g., FIG. 15 and the descriptions thereof. The heat map images may have a plurality of first regions of different shades of color. For each first region, a darker color means a larger count of the at least one feature occurring within the first region.

It should be noted that the above description regarding the process 200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 3:
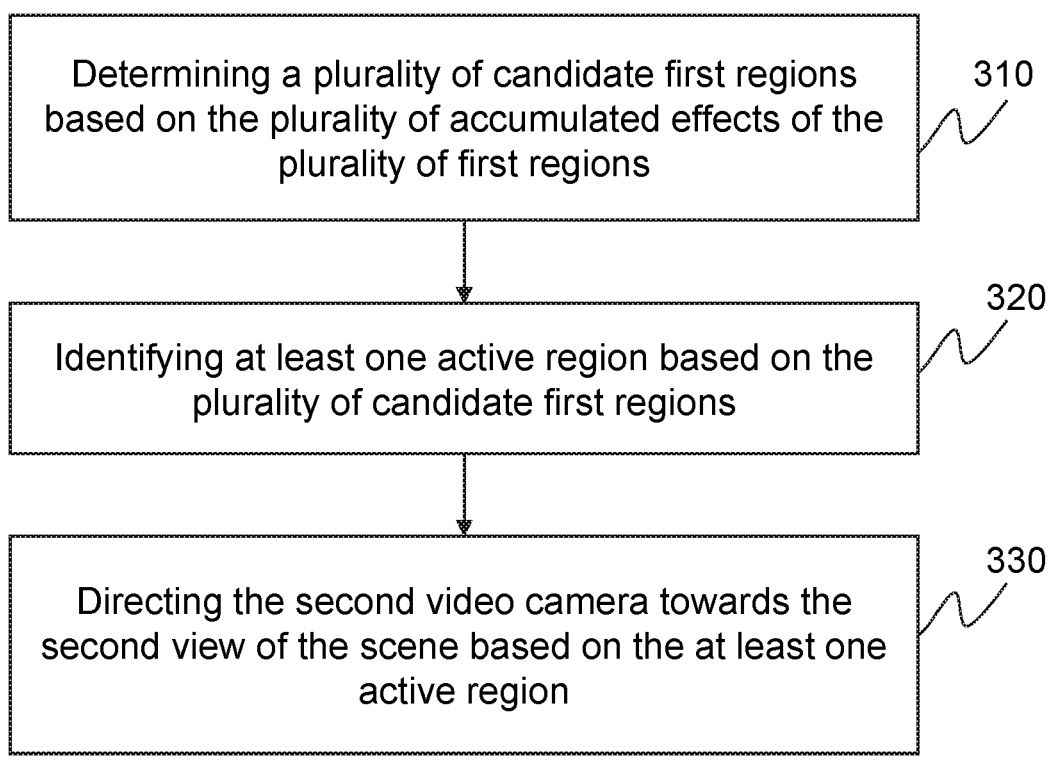
FIG. 3 is a flowchart illustrating an exemplary process of directing a second video camera towards a second view according to some embodiments of the present disclosure.

FIG. 3 is a flowchart illustrating an exemplary process 300 of directing the second video camera towards the second view according to some embodiments of the present disclosure. In some embodiments, the operation 140 may be performed according to the process 300.

In 310, a processor may determine a plurality of candidate first regions based on the plurality of accumulated effects of the plurality of first regions as described in connection with the operation 130. For illustration purpose, the accumulated effect may be the count of the at least one feature occurring within each of the plurality of first regions. The processor may compare the count of the at least one feature occurring within the first region with a first threshold. If the count of the at least one feature occurring within the first region is greater than the first threshold, the processor may determine the first region as a candidate first region. If the count of the at least one feature occurring within the first region is not greater than the first threshold, the processor may determine the first region as a non-candidate first region.

In 320, the processor may identify at least one active region based on the plurality of candidate first regions. In some embodiments, the processor may identify the at least one active region based on the position information of the plurality of candidate first regions. For example, the processor may determine horizontal and/or vertical coordinates of each of the plurality of candidate first regions. The processor may further determine the minimum horizontal coordinate, the maximum horizontal coordinate, the minimum vertical coordinate and/or the maximum vertical coordinate of the plurality of candidate first regions, and determine the active region based on the minimum horizontal coordinate, the maximum horizontal coordinate, the minimum vertical coordinate and/or the maximum vertical coordinate. For example, the coordinates of central points of the candidate first regions may be $(x_1, y_1)$, $(x_2, y_2)$, $(x_3, y_3)$, and $(x_4, y_4)$, respectively. The minimum horizontal coordinate may be $x_1$, the maximum horizontal coordinate may be $x_4$, the minimum vertical coordinate may be $y_3$ and the maximum vertical coordinate may be $y_2$. The processor may determine a rectangle region as the active region. The four vertexes coordinates of the rectangle region may be $(x_1, y_3)$, $(x_1, y_2)$, $(x_4, y_3)$ and $(x_4, y_2)$. Thus, the plurality of candidate first regions may be all included in the rectangle region.

In some embodiments, the processor may cluster the plurality of candidate first regions, and determine at least one active region based on the clustering result of the plurality of candidate first regions. For example, the processor may cluster the plurality of candidate first regions into at least one candidate active region, and determine a feature density of each of the at least one candidate active region. The feature density may indicate a proportion of candidate first regions included in each of the at least one candidate active region among all the candidate first regions. The processor may compare the feature density of each of the at least one candidate active region with a second threshold. If the feature density is greater than the second threshold, the processor may determine the candidate active region as an active region.

For another example, the processor may cluster the plurality of candidate first regions into at least one candidate active region, and determine a total count of the at least one feature in each of the at least one candidate active region. The processor may further compare the total count of the at least one feature of the candidate active region with a third threshold. If the total count of the at least one feature of the candidate active region is greater than the third threshold, the processor may determine the candidate active region as an active region.

In 330, the processor may direct the second video camera towards the second view of the scene based on the at least one active region. Thus, the second video camera may focus on the at least one active region and acquire image information thereof. In some embodiments, the acquired image information may be a real-time surveillance video.

It should be noted that the above description regarding the process 300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 4:
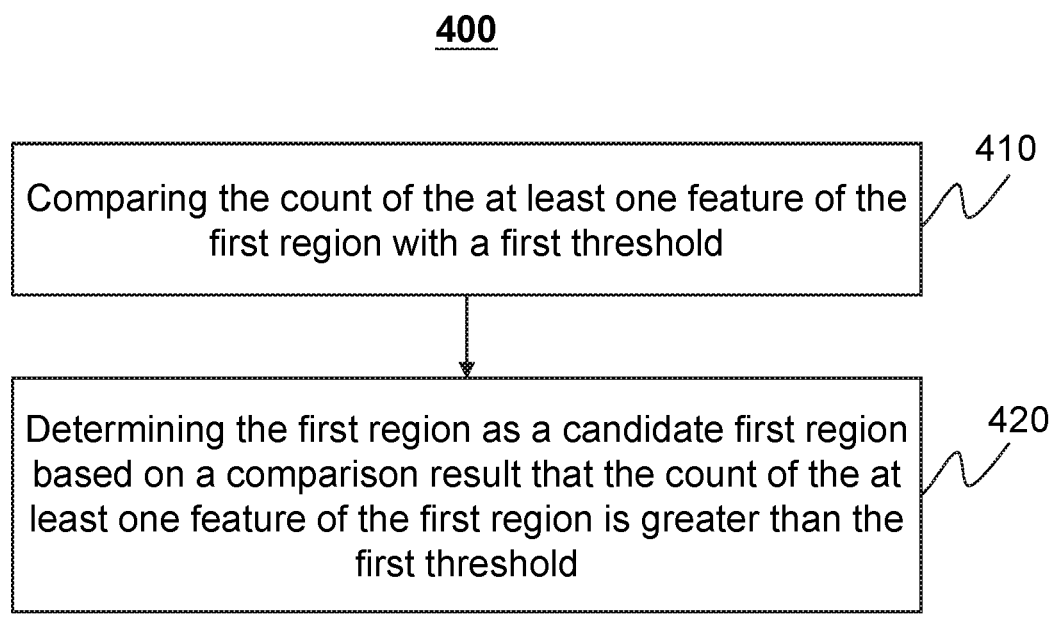
FIG. 4 is a flowchart illustrating an exemplary process of determining a candidate first region according to some embodiments of the present disclosure.

FIG. 4 is a flowchart illustrating an exemplary process 400 of determining a candidate first region according to some embodiments of the present disclosure. In some embodiments, the operation 310 may be performed in connection with the process 400.

In 410, the processor may compare the count of the at least one feature of the first region with a first threshold. The first threshold may be zero or a value larger than zero. If the first threshold is zero, the first region may be determined as the candidate first region as long as a feature appears within the first region. If the first threshold is a value larger than zero, the first region may be determined as the candidate first region when the count the at least one feature within the first region is greater than the first threshold.

In 420, the processor may determine the first region as a candidate first region based on a comparison result that the count of the at least one feature of the first region is greater than the first threshold. For example, the counts of the features in first region A, first region B and first region C may be 8, 12 and 15, respectively. If the first threshold is zero, the processor may determine all of first region A, first region B and first region C as the candidate first regions. If the first threshold is 10, the processor may determine first region B and first region C as the candidate first regions. First region A may be determined as a non-candidate first region.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 5:
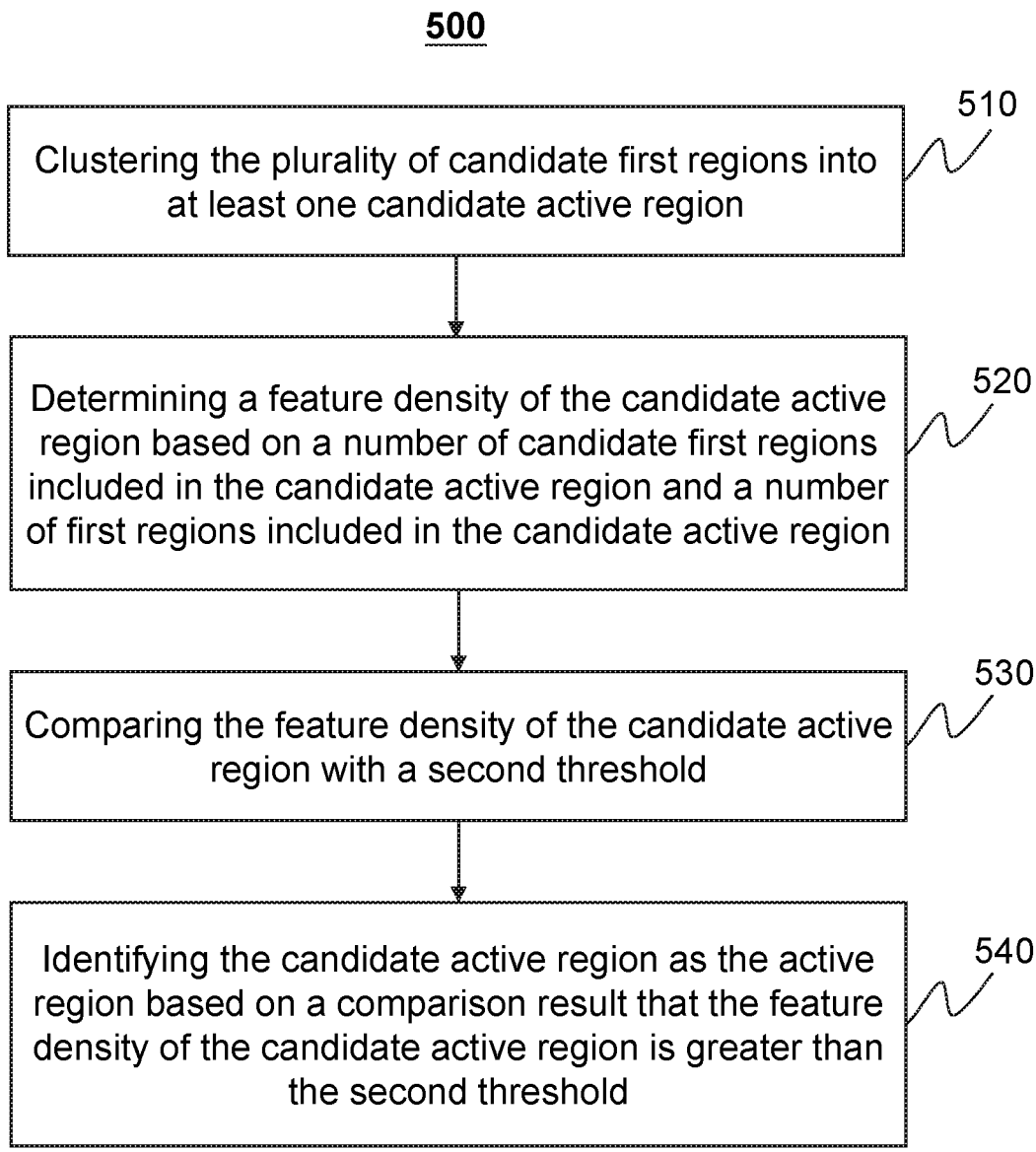
FIG. 5 is a flowchart illustrating an exemplary process of identifying an active region according to some embodiments of the present disclosure.

FIG. 5 is a flowchart illustrating an exemplary process 500 of identifying the active region according to some embodiments of the present disclosure. In some embodiments, the operation 320 may be performed in connection with process 500.

In 510, the processor may cluster the plurality of candidate first regions into at least one candidate active region. In some embodiments, the processor may cluster the plurality of candidate active region according to a cluster algorithm. The cluster algorithm may include k-means clustering, mean-shift clustering, hierarchical clustering, density-based spatial clustering of applications with noise, Gaussian mixture models using the expectation-maximization algorithm, or the like, or any combine thereof. In some embodiments, the at least one candidate active region may include a plurality of candidate first regions and a plurality non-candidate first regions. The count of the at least one feature within each of the plurality of non-candidate first regions is not greater than the first threshold.

In 520, the processor may determine the feature density of the candidate active region. In some embodiments, after clustering the plurality of candidate first regions into at least one candidate active region, the processor may determine the number of candidate first regions included in the candidate active region, the number of non-candidate first regions included in the candidate active region, and/or the number of first regions included in the candidate active region. Further, the processor may determine the feature density of the candidate active region based on the number of candidate first regions included in the candidate active region and the number of first regions included in the candidate active region. In some embodiments, the feature density may be a ratio between the number of candidate first regions and the number of first regions included in the candidate active region. Alternatively or additionally, the feature density may be a ratio between the number of non-candidate first regions and the number of first regions included in the candidate active region. Alternatively or additionally, the feature density may be a radio between the number of candidate first regions and the number of non-candidate first regions included in the candidate active region. For example, assuming that candidate first region D includes 30 candidate first regions and 20 non-candidate first regions. The feature density of candidate first region D may be 60 percent when the processor determines the feature density as the ratio between the number of candidate first regions and the number of first regions included in the candidate active region. The feature density of candidate first region D may be 40 percent when the processor determines the feature density as the ratio between the number of non-candidate first regions and the number of first regions included in the candidate active region. The feature density of candidate first region D may be 1.5 when the processor determines the feature density as the radio between the number of candidate first regions and the number of non-candidate first regions included in the candidate active region.

In 530, the processor may compare the feature density of the candidate active region with the second threshold. In some embodiments, if the processor determines the feature density as the ratio between the number of candidate/non-candidate first regions and the number of first regions, the second threshold may be a value, which is less than one, such as 60 percent. In some embodiments, if the processor determines the feature density as the radio between the number of candidate first regions and the number of non-candidate first regions included in the candidate active region, the second threshold may be a value larger than zero, such as 1.5.

In 540, the processor may identify the candidate active region as the active region based on a comparison result that the feature density of the candidate active region is greater than the second threshold. For example, if the second threshold is 50 percent and the feature density of candidate active region D is 60 present. The processor may determine candidate active region D as an active region.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 6 is a flowchart illustrating another exemplary process 600 of identifying a candidate active region as an active region according to some embodiments of the present disclosure. In some embodiments, the operation 320 may be performed in connection with process 600.

In 610, the processor may determine a total count of the at least one feature of the candidate active region based on the count of the at least one feature of each candidate first region included in the candidate active region. In some embodiments, the candidate active region may include a plurality of candidate first regions. The processor may add up all the count of the at least one feature of each of the plurality of candidate first regions included in the candidate active region to generate the total count of the candidate active region. For example, candidate active region E may include five candidate first regions, and the counts of the at least one feature of these five candidate first regions may be 5, 8, 6, 2, and 10, respectively. The processor may add up all the five counts corresponding to the five candidate first regions included in candidate active region E to generate the total count 26 of candidate active region E.

In 620, the processor may compare the total count of the at least one feature of the candidate active region with a third threshold. In some embodiments, the third threshold may be a fixed value, such as, 20. In some embodiments, the third threshold may be adjustable according to the area of the candidate active region.

In 630, the processor may identify the candidate active region as the active region based on a comparison result that the total count of the at least one feature of the candidate active region is greater than the third threshold.

In some embodiments, the active region may have the shape of a circle, an ellipse, a triangle, a polygon, or the like, or any combine thereof. The number of the active regions may be one or more, which is not limited in the present disclosure.

In some embodiments, the processor may compare the feature density with the second threshold and compare the total count of the at least one feature of the candidate active region with the third threshold. Further, the processor may identify the candidate active region as the active region based on a comparison result that the feature density of the candidate active region is greater than the second threshold and the total count of the at least one feature of the candidate active region is greater than the third threshold.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 7:
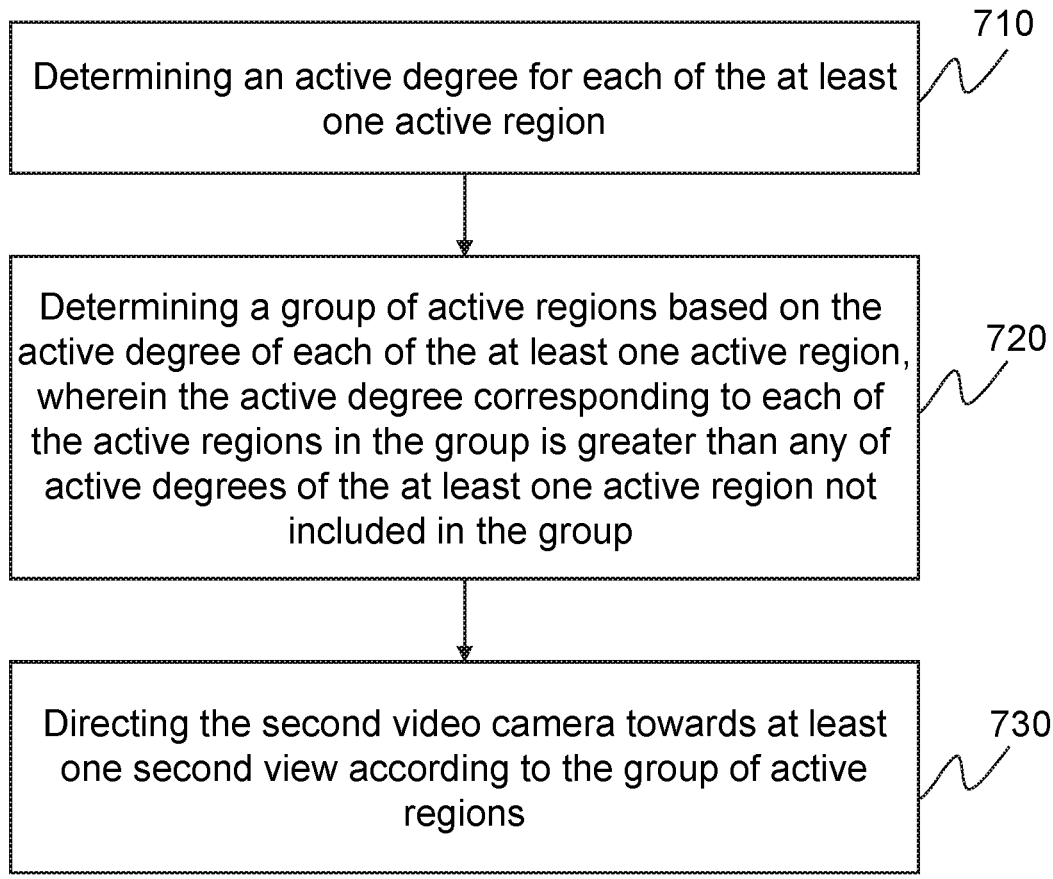
FIG. 7 is a flowchart illustrating an exemplary process of directing the second video camera towards at least one second view according to some embodiments of the present disclosure.

FIG. 7 is a flowchart illustrating an exemplary process 700 of directing the second video camera towards at least one second view according to some embodiments of the present disclosure. In some embodiments, the operation 140 may be performed in connection with process 700.

In 710, the processor may determine an active degree for each of the at least one active region. A higher active degree of an active region may represent more features occurred in the active regions. In some embodiments, the processor may determine the active degree for each of the at least one active region as a ratio between a total count of the at least one feature of the active region and the number of first regions included in the active region. The active degree may represent an average count of the at least one feature of the first regions included in the active region, which indicates a frequency of the feature appeared in the active region. Therefore, a larger average count of the at least one feature of the first regions included in the active region means a higher active degree of the active region.

In 720, the processor may determine a group of active regions based on the active degree of each of the at least one active region. In some embodiments, the active degree corresponding to each of the active regions in the group may be greater than any of the active degrees of the at least one active region not included in the group.

In some embodiments, the processor may rank the at least one active region based on the active degree corresponding to each of the least one active region in a descending order. Further, the processor may combine the first M active regions to generate the group active regions. In some embodiments, the processor may compare the active degree corresponding to each of the at least one active region with a fourth threshold. Further, the processor may combine the active regions whose active degree is greater than the fourth threshold to generate the group active regions.

In 730, the processor may direct the second video camera towards at least one second view according to the group of active regions. In some embodiments, the processor may determine a second view for each of the active regions included in the group of active regions. The second view may be determined based on the position information of each of the active regions included in the group of active regions. For example, for each of the active regions included in the group of active regions, the processor may determine the corresponding second view based on the central point coordinate of the active region. As another example, for each of the active regions included in the group of active regions, the processor may determine the corresponding second view based on the average coordinates of the first regions included in the active region. For example, active region M includes three first regions O, P and Q. The central point coordinates of the three first regions O, P and Q are $(x_o, y_o)$, $(x_p, y_p)$, and $(x_q, y_q)$, respectively. The horizontal coordinate of active region M $x_m$ may be determine as the average horizontal coordinates of the three first regions O, P and Q, i.e., $$x_m = \frac{x_O + x_P + x_Q}{3}.$$

Similarly, the vertical coordinate of active region M may be determine as the average vertical coordinates of the three first regions O, P and Q, i.e., $$y_m = \frac{y_O + y_P + y_Q}{3}.$$

In some embodiments, after directing the second video camera towards at least one second view according to the group of active regions, the processor may control the second video camera to capture a video according to the second view of the scene. The second view of the scene may provide the closer view than the first view based on the different level of zoom of the second video camera compared with the first video camera.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 8:
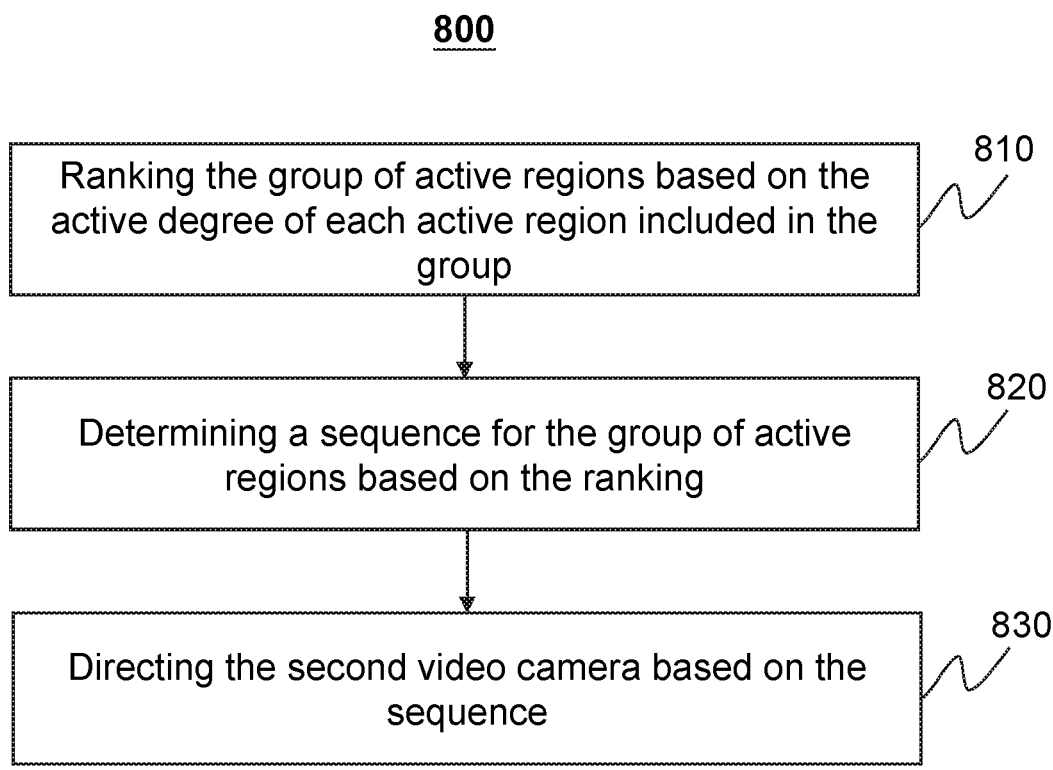
FIG. 8 is a flowchart illustrating an exemplary process of directing the second video camera based on a sequence according to some embodiments of the present disclosure.

FIG. 8 is a flowchart illustrating an exemplary process 800 of directing the second video camera based on a sequence according to some embodiments of the present disclosure. In some embodiments, the operation 730 may be performed in connection with process 800.

In 810, the processor may rank the at least one active region in the group of active regions based on the active degree of each active region included in the group.

In 820, the processor may determine a sequence for the group of active regions based on the ranking. If the processor ranks the group of active regions from large active degree to small active degree, the sequence for the group of active regions may be in accordance with the ranking result. If the processor ranks the group of active regions from small active degree to large active degree, the sequence for the group of active regions may be contrary to the ranking result.

In 830, the processor may direct the second video camera based on the sequence. In some embodiments, the processor may direct the second video camera towards the active region with largest active degree and control the second video camera to capture video of the active region with the largest active degree first. Then the processor may direct the second video camera towards the active region with second largest active degree and control the second video camera to capture video of the active region with the second largest active degree. In some embodiments, the user may manually set one or more active regions, and the processor may preferentially direct the second video camera towards the manually set one or more active regions and control the second video camera to capture video of the manually set one or more active regions.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 9:
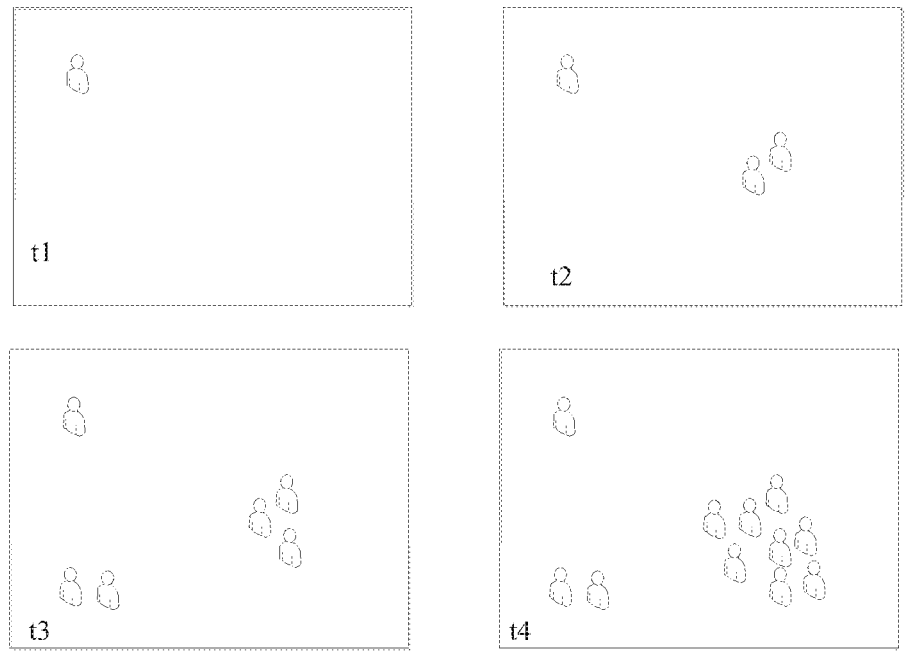
FIG. 9 is a schematic diagram illustrating at least one exemplary feature occurring within a first region in a period according to some embodiments of the present disclosure.

FIG. 9 is a schematic diagram illustrating at least one exemplary feature occurring within a first region in a period according to some embodiments of the present disclosure.

As shown in FIG. 9, the count of features in the video image within the time period $t_1$ to $t_4$ may be 11. A new feature may appear in the video image at time Two new features may appear in the video image at time $t_2$. Three new features may appear in the video image at time $t_3$. Five new features may appear in the video picture at time $t_4$. Assuming that the first threshold is zero, each region that includes a feature may be determined as the candidate first region within the video image.

Figure 10:
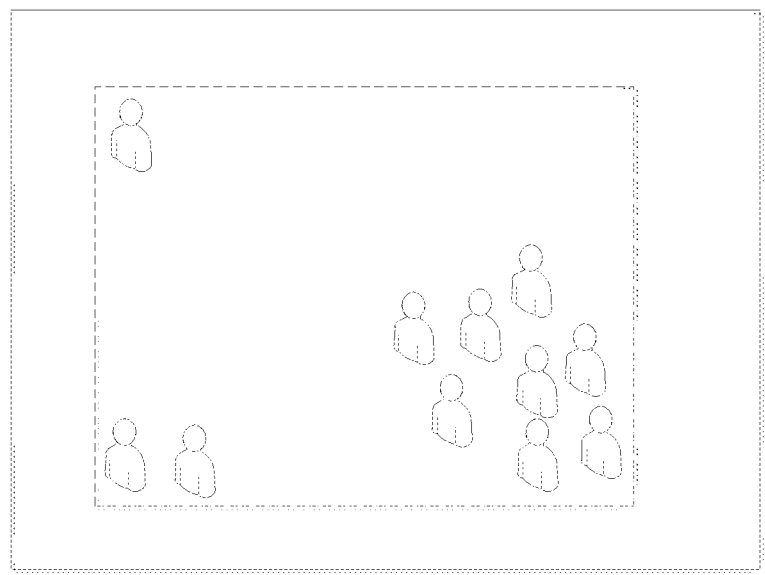
FIG. 10 is a schematic diagram illustrating an exemplary active region according to some embodiments of the present disclosure.

FIG. 10 is a schematic diagram illustrating an exemplary active region according to some embodiments of the present disclosure.

In some embodiments, if the number of the active regions is one, the technique for determining the active region may include determining a minimum coordinate and a maximum coordinate of all candidate first regions, and determining the active region according to the minimum coordinate and maximum coordinate. As a result, all candidate first regions may be included in the active region, and the finally determined active region may be the rectangular dashed box region as shown in FIG. 10.

Figure 11:
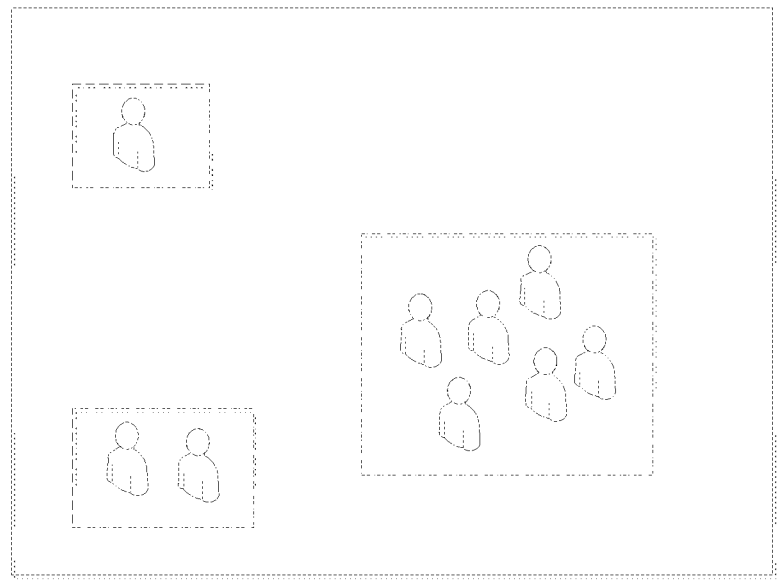
FIG. 11 is a schematic diagram illustrating exemplary active regions according to some embodiments of the present disclosure.

FIG. 11 is a schematic diagram illustrating exemplary active regions according to some embodiments of the present disclosure.

In some embodiments, if the number of the active regions is more than one, the technique for determining the active region may include partitioning all candidate first regions according to position coordinates of each candidate first region to obtain at least one active region. For example, the processor may perform a cluster process to partition candidate first regions according to position coordinates of each candidate first region. Assuming that the first threshold is zero, each region that includes a feature may be determined as the candidate first region in the video image. As shown in FIG. 11, the processor clusters the candidate first regions into three candidate active regions. The feature density of each of the three active regions is greater than a second threshold. Therefore, the processor determines the three candidate active regions as three active regions.

Figure 12:
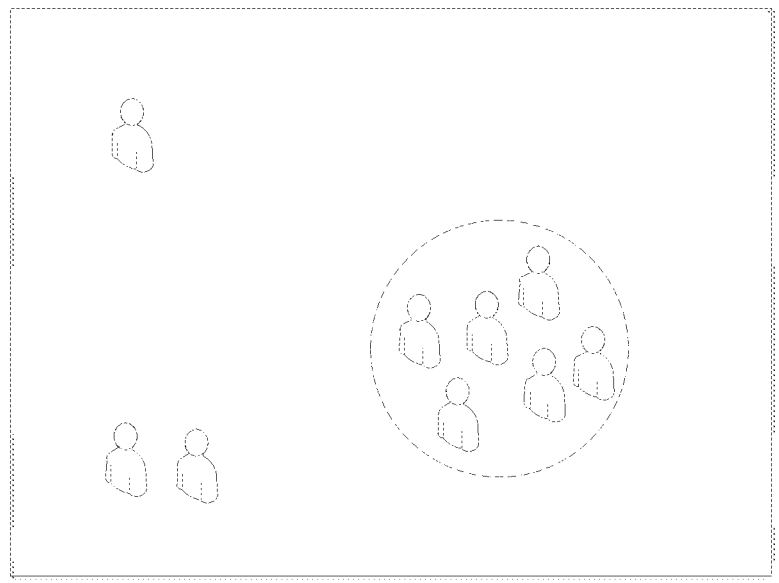
FIG. 12 is a schematic diagram illustrating another exemplary active region according to some embodiments of the present disclosure.

FIG. 12 is a schematic diagram illustrating another exemplary active region according to some embodiments of the present disclosure.

In some embodiments, the processor may determine the active region based on the third threshold. Referring back to FIG. 11, three candidate active regions appear in the video image. The processor may compare the count of the features in each of the three candidate active regions with a third threshold. As shown in FIG. 12, only the candidate active region in the lower right corner represented by the circular dashed box has a count greater than the third threshold. As a result, the processor may only identify the candidate active region in the lower right corner as the active region.

In this way, the processor may obtain the active regions with large counts of at least one features, achieving the effect of dynamically adjusting the monitoring screen of the dome camera.

In some embodiments, before enabling the dome camera to perform image acquisition in the scene corresponding to the at least one active region, the processor may further determine an active degree for each of active regions, and rank the at least one active region in based on the activity degrees in a descending order. The dome camera may perform image acquisition in the view of the scene corresponding to the first M active regions.

Figure 13:
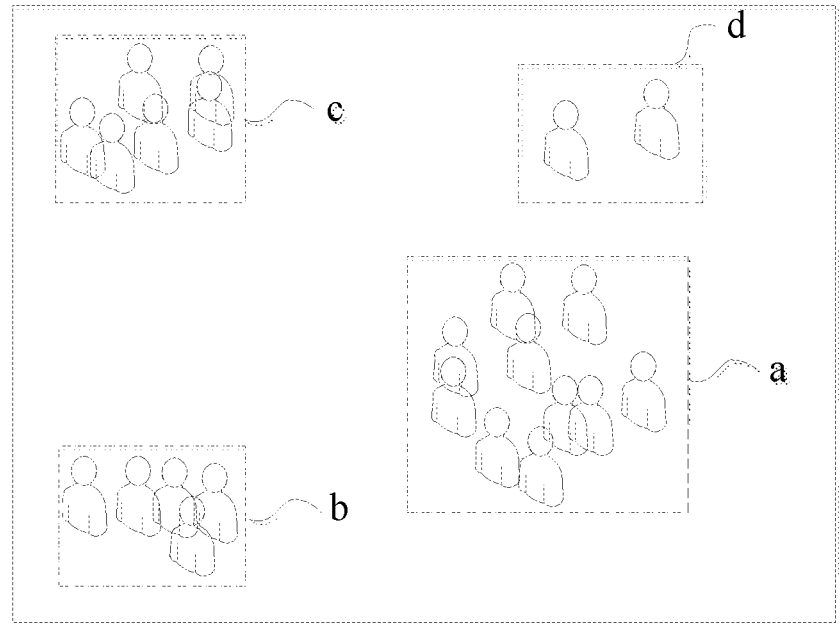
FIG. 13 is a schematic diagram illustrating exemplary active regions according to some embodiments of the present disclosure.

FIG. 13 is a schematic diagram illustrating other exemplary active regions according to some embodiments of the present disclosure.

In some embodiments, an average count, which is the ratio of a total counts of the at least one feature of the first regions included in the active region and the number of the at least one feature of the first regions included in the active region, may indicate the frequency of the feature appearing in the active region. As shown in FIG. 13, the average count of the active region with the minimum area maybe set as the fourth threshold. The processor may rank the candidate active regions in an order of active degree from high to low as a, b, c and d. If only first three candidate active regions may be determine as the active regions, the dome camera may only perform image acquisition in the scenes of views corresponding to three active regions of a, b and c.

In this way, the processor may obtain the active regions with large counts of at least one features, achieving the effect of dynamically adjusting the monitoring screen of the dome camera.

In some embodiments, after ranking the at least one active regions in an descending order of active degrees and before enabling the dome camera to perform image acquisition in the scenes of views corresponding to the first M active regions, the processor may number the scenes of views corresponding to the first M active regions. Further, the processor may save the scenes of views corresponding to the first M active regions. A larger active degree of active region may correspond to a larger number of the active regions. The dome camera may perform image acquisition in the scenes of views corresponding to the first M active regions in a descending order of the number.

With reference to FIG. 13, the scenes corresponding to the three active regions of a, b and c may be numbered, respectively. The number corresponding to scene a may be 003, the number corresponding to scene b may be 002 and the number corresponding to scene c may be 001. The processor may save the scene parameters corresponding to the scenes 001, 002 and 003, so that during the image acquisition, the dome camera may perform image acquisition in the scenes corresponding to the three active regions of a, b and c in a descending order of the number.

In this way, the processor may save the scenes corresponding to the first M active regions with a higher active degree in the dome camera. The dome camera may perform image acquisition in the scenes corresponding to the first M active regions with higher activity degrees, achieving the effect of dynamically adjusting the monitoring screen of the dome camera.

Figure 14:
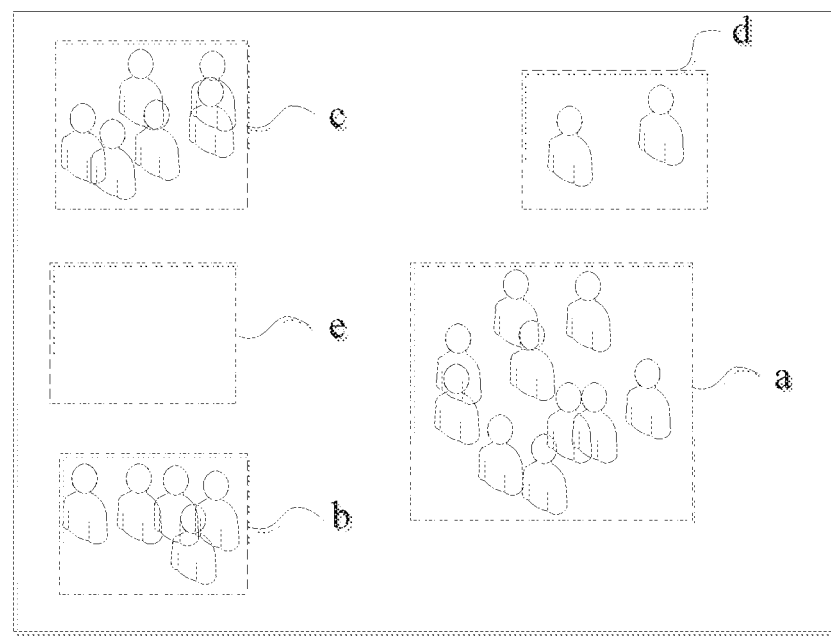
FIG. 14 is a schematic diagram illustrating exemplary active regions and a manually set region according to some embodiments of the present disclosure.

FIG. 14 is a schematic diagram illustrating exemplary active regions and a manually set region according to some embodiments of the present disclosure.

In some embodiments, before enabling the dome camera to perform image acquisition in the scenes corresponding to the at least one active region, the processor may determine that the dome camera has a scene manually set by the user. The dome camera may preferentially perform image acquisition in the scene manually set by the user.

As shown in FIG. 14, besides the scenes corresponding to the determined active regions, the dome camera also saves a scene e manually set by the user. The dome camera may preferentially perform image acquisition in the scene e, and then perform image acquisition in the scenes corresponding to the three active regions of a, b, c and d.

In this way, it is possible to perform image acquisition in the scene manually set by the user preferentially, which may improve the user experience.

In some embodiments, after determining at least one active region according to the screened candidate first region, the processor may determine first zoom information of the at least one active region in the box camera. The processor may determine a mapping relationship between the box camera and the dome camera. Then, the processor may determine second zoom information in the dome camera corresponding to the first zoom information of the at least one active region according to the mapping relationship and the first zoom information. After enabling the dome camera to perform image acquisition in the scenes corresponding to the at least one active region, the processor may perform a zoom display in the scene corresponding to the at least one active region according to the second zoom information.

In this way, the dome camera may perform the zoom display in the scene corresponding to the active regions, which may provide a more diversified display effect and may improve the user experience.

FIG. 15 is a schematic diagram illustrating an exemplary hot map with a plurality of regions according to some embodiments of the present disclosure.

In some embodiments, the camera may have a heat map function. The heat map function may cause the camera to generate the heat map images as following steps. The camera may perform statistical analysis on the features in the video images collected within a predetermined period to obtain the changes of features in each position of the video image and generate the heat map images according to the change of the features in the video images within the predetermined period. The generated heat map images may have multiple regions of different shades of color. The darker color of a region means a more frequent feature change in the region. With reference to FIG. 15, the heat map image generated by the camera has at least three-color regions A, B and C. The color of region C is darker than that of region B, and the color of region B is darker than that of region A. The feature changes most frequently in region A, and less frequently in region B. No feature appears in the blank region other than regions A, B and C.

Figure 16:
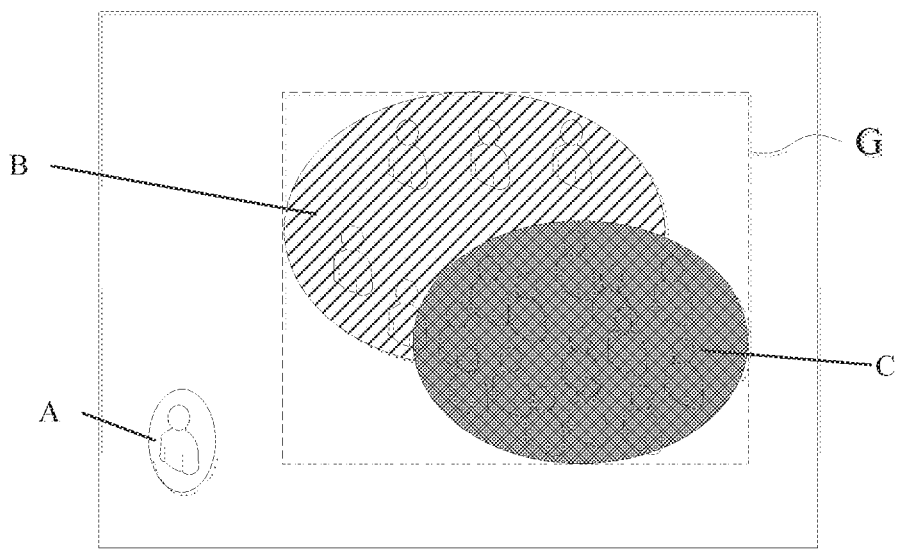
FIG. 16 is a schematic diagram illustrating an exemplary hot map with an active region according to some embodiments of the present disclosure.

FIG. 16 is a schematic diagram illustrating an exemplary hot map with an active region according to some embodiments of the present disclosure.

In some embodiments, the processor may directly determine the active regions in combination with the heat map function of the camera. As shown in FIG. 16, the active region G can be determined based on region B and region C with a more frequent feature change. The dome camera may be enabled to perform an image acquisition in the scene corresponding to the active region G according to the mapping relationship between the box camera images and the dome camera images.

In this way, the active regions may be determined, and the dome camera may perform the image acquisition in the scene corresponding to the active regions, which may achieve the effect of dynamically adjusting the monitoring screen of the dome camera. In the whole image acquisition process, the scene setting of the dome camera does not need manual interpretation, which may improve the efficiency and accuracy of image acquisition.

Figure 17:
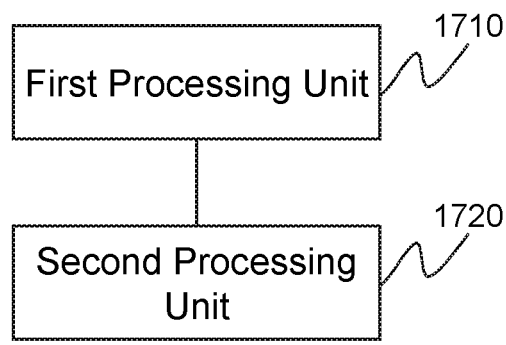
FIG. 17 is a schematic block diagram of an exemplary image acquisition system according to some embodiments of the present disclosure.

FIG. 17 is a schematic block diagram of an exemplary image acquisition system 1700 according to some embodiments of the present disclosure. The image acquisition system 1700 may include a first processing unit 1710 and a second processing unit 1720.

The first processing unit 1710 may be configured to determine an accumulated effect of at least one feature occurring within the period within at least one of a plurality of first regions. For example, the first processing unit 1710 may identify whether the at least one feature occurs within the first region and generate the count of the at least one feature occurs within the first region based on the plurality of identifications of whether the at least one feature occurs within the first region. Further, the first processing unit 1710 may compare the count of the at least one feature of the first region with a first threshold and determine the first region as a candidate first region based on a comparison result that the count of the at least one feature of the first region is greater than the first threshold.

In some embodiments, to determine the active regions, the first processing unit 1710 may cluster the plurality of candidate first regions into at least one candidate active region. Then, the first processing unit 1710 may determine a feature density of the candidate active region and compare the feature density of the candidate active region with a second threshold. Based on a comparison result that the feature density of the candidate active region is greater than the second threshold, the first processing unit 1710 may identify the candidate active region as the active region.

In some embodiments, to determine the active regions, the first processing unit 1710 may determine the total count of the at least one feature of the candidate active region based on the count of the at least one feature of each candidate first region included in the candidate active region. Further, the first processing unit 1710 may compare the total count of the at least one feature of the candidate active region with a third threshold. Based on a comparison result that the total count of the at least one feature of the candidate active region is greater than the third threshold, the first processing unit 1710 may identify the candidate active region as the active region.

The second processing unit 1720 may determine an active degree for each of the at least one active region. Based on the active degree of each of the at least one active region, the second processing unit 1720 may determine a group of active regions. The active degree corresponding to each of the active regions in the group may be greater than any of active degrees of the at least one active region not included in the group. Further, the second processing unit 1720 may direct the second video camera towards at least one second view determined by the group of active regions.

In some embodiments, the second processing unit 1720 may rank the group of active regions based on the active degree of each active region included in the group and determine a sequence for the group of active regions based on the ranking result. Then, the second processing unit 1720 may direct the second video camera based on the sequence.

In some embodiments, after ranking the at least one active regions, the second processing unit 1720 may number the scenes of views corresponding to first M active regions. Further, the processor may save the scenes of views corresponding to the first M active regions. The dome camera may perform image acquisition in the scenes of views corresponding to the first M active regions in a descending order of the number.

In some embodiments, the second processing unit 1720 may determine first zoom information of the at least one active region in the box camera. The second processing unit 1720 may determine a mapping relationship between the box camera and the dome camera. Then, the second processing unit 1720 may determine second zoom information in the dome camera corresponding to the first zoom information of the at least one active region according to the mapping relationship and the first zoom information. The second processing unit 1720 may perform a zoom display in the scene corresponding to the at least one active region according to the second zoom information.

Figure 18:
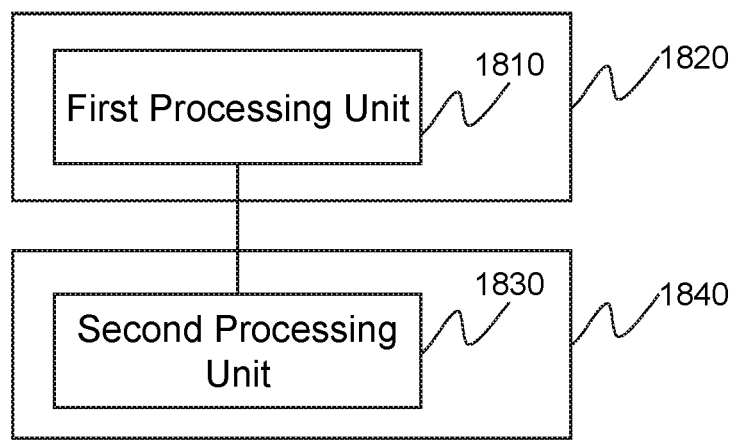
FIG. 18 is a schematic block diagram of another exemplary image acquisition system according to some embodiments of the present disclosure.

FIG. 18 is a schematic block diagram of another exemplary image acquisition system 1800 according to some embodiments of the present disclosure. The image acquisition system may include a first processing unit 1810 included in a box camera 1820 and a second processing unit 1830 included in a dome camera 1840. The operations of the first processing unit 1810 and the second processing unit 1830 may refer to the corresponding description in the above-mentioned image acquisition system 1700 provided in the present disclosure.

Figure 19:
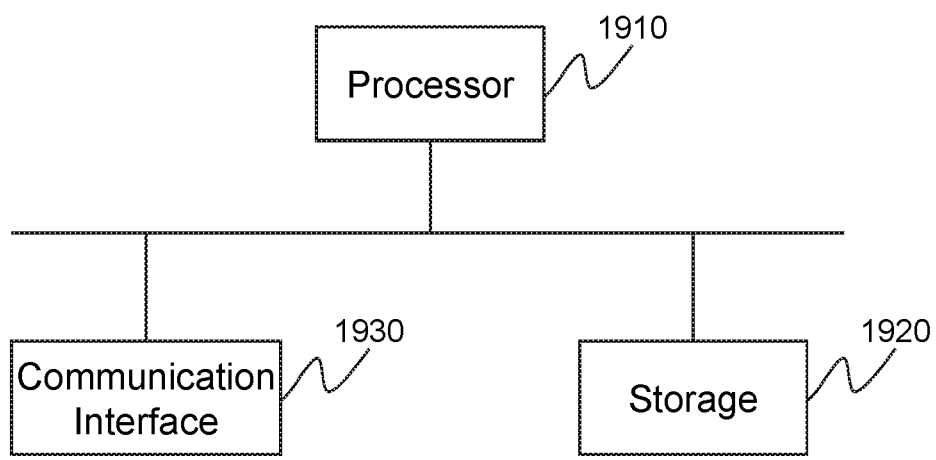
FIG. 19 is a schematic block diagram of an exemplary image acquisition device according to some embodiments of the present disclosure.

FIG. 19 is a schematic block diagram of an exemplary image acquisition device 1900 according to some embodiments of the present disclosure. The image acquisition device may include a processor 1910, a storage 1920 and a communication interface 1930.

The storage 1920 may store instructions that may be executed by the processor 1910, and the processor 1910 may execute the instructions stored in the storage 1920 to execute the image acquisition method in the embodiment of the disclosure by using the communication interface 1930. The operations of the processor 1910 refer to the corresponding description of operations in flowcharts (for example, the process 100 in FIG. 1) in the present disclosure. For example, in the process 100, the operation 130 may be perform by the processor 1910 to determine an accumulated effect of at least one feature.

In some embodiments, the processor 1910, the storage 1920 and the communication interface 1930 may be included in the box camera and/or the dome camera.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "some embodiments," and/or "some embodiments" mean that a particular characteristic, structure or characteristic described in connection with some embodiments is included in at least one embodiment of the present disclosure. Therefore, it is emphasized and should be appreciated that two or more references to "some embodiments" or "one embodiment" or "an alternative embodiment" in various portions of this specification are not necessarily all referring to the same embodiment. Furthermore, the particular characteristics, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for performing operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various characteristics are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more characteristics than are expressly recited in each claim. Rather, claimed subject matter may lie in less than all characteristics of a single foregoing disclosed embodiment.

I claim:

1. A system for image acquisition, comprising:
at least one storage medium storing a set of instructions; and
at least one processor configured to communicate with the at least one storage medium, wherein when executing the set of instructions, the at least one processor is directed to cause the system to:
receive a video from a first video camera in a period, the video including a first view of a scene;
delineate a plurality of first regions within the first view of the scene;
determine an accumulated effect of at least one feature occurring within the period within at least one of the plurality of first regions;
identify, based on the plurality of accumulated effects of the plurality of first regions, a plurality of candidate first regions from the plurality of first regions;
identify at least one active region from the plurality of candidate first regions by clustering the plurality of candidate first regions; and
direct a second video camera towards a second view of the scene based on the coordinates of the at least one active region in the first video camera, and a coordinate mapping relationship between the first video camera and the second video camera.

2. The system of claim 1, wherein the at least one processor is further directed to cause the system to:
control the second video camera to capture video according to the second view of the scene, wherein the second view of the scene provides a closer view than the first view based on a different level of zoom of the second video camera compared to the first video camera.

3. The system of claim 1, wherein to determine the accumulated effect of at least one feature, the at least one processor is further directed to cause the system to:
generate a count of the at least one feature that occurs in the period within at least one of the plurality of first regions.

4. The system of claim 3, wherein to delineate the plurality of first regions within the first view of the scene, the at least one processor is further directed to cause the system to:
delineate the plurality of first regions based on a resolution of the video.

5. The system of claim 3, wherein to generate the count of the at least one feature that occurs in the period within at least one of the plurality of first regions, the at least one processor is further configured to:

for each of the plurality of first regions:
  for every predetermined time interval in the period, identify whether the at least one feature occurs within the first region; and
  generate the count of the at least one feature that occurs within the first region based on the plurality of identifications of whether the at least one feature occurs within the first region.

6. The system of claim 5, wherein to identify the plurality of candidate first regions from the plurality of first regions based on the plurality of accumulated effects of the plurality of first regions, the at least one processor is further directed to cause the system to:
for each of the plurality of first regions:
  compare the count of the at least one feature of the first region with a first threshold; and
  determine the first region as a candidate first region based on a comparison result that the count of the at least one feature of the first region is greater than the first threshold.

7. The system of claim 1, wherein to identify the at least one active region from the plurality of candidate first regions by clustering the plurality of candidate first regions, the at least one processor is further directed to cause the system to:
  cluster the plurality of candidate first regions into at least one candidate active region;
  for each of the at least one candidate active region;
  determine a feature density of the candidate active region based on a number of candidate first regions included in the candidate active region and a number of first regions included in the candidate active region;
  compare the feature density of the candidate active region with a second threshold; and
  identify the candidate active region as the active region based on a comparison result that the feature density of the candidate active region is greater than the second threshold.

8. The system of claim 7, wherein for each of the at least one candidate active region, the at least one processor is further directed to cause the system to:
  determine a total count of the at least one feature of the candidate active region based on the count of the at least one feature of each candidate first region included in the candidate active region;
  compare the total count of the at least one feature of the candidate active region with a third threshold; and
  identify the candidate active region as the active region based on a comparison result that the total count of the at least one feature of the candidate active region is greater than the third threshold.

9. The system of claim 8, wherein the at least one processor is further directed to cause the system to:
  determine an active degree for each of the at least one active region;
  determine a group of active regions based on the active degree of each of the at least one active region, wherein the active degree corresponding to each of the active regions in the group is greater than any of active degrees of the at least one active region not included in the group; and
  direct the second video camera towards at least one second view according to the group of active regions.

10. The system of claim 9, wherein to direct the second video camera towards at least one second view according to the group of active regions, the at least one processor is further directed to cause the system to:

rank the group of active regions based on the active degree of each active region included in the group;
determine a sequence for the group of active regions based on the ranking; and
direct the second video camera based on the sequence.

11. A method for image acquisition, comprising:
  receiving a video from a first video camera in a period, the video including a first view of a scene;
  delineating a plurality of first regions within the first view of the scene;
  determining an accumulated effect of at least one feature occurring within the period within at least one of the plurality of first regions;
  identifying, based on the plurality of accumulated effects of the plurality of first regions, a plurality of candidate first regions from the plurality of first regions;
  identifying at least one active region from the plurality of candidate first regions by clustering the plurality of candidate first regions; and
  directing a second video camera towards a second view of the scene based on the coordinates of the at least one active region in the first video camera, and a coordinate mapping relationship between the first video camera and the second video camera.

12. The method of claim 11, wherein the determining the accumulated effect of at least one feature includes:
  generating a count of the at least one feature that occurs in the period within at least one of the plurality of first regions.

13. The method of claim 12, wherein the generating the count of the at least one feature that occurs in the period within at least one of the plurality of first regions includes:
for each of the plurality of first regions:
  for every predetermined time interval in the period, identifying whether the at least one feature occurs within the first region; and
  generating the count of the at least one feature that occurs within the first region based on the plurality of identifications of whether the at least one feature occurs within the first region.

14. The method of claim 13, wherein the identifying the plurality of candidate first regions from the plurality of first regions based on the plurality of accumulated effects of the plurality of first regions includes:
for each of the plurality of first regions:
  comparing the count of the at least one feature of the first region with a first threshold; and
  determining the first region as a candidate first region based on a comparison result that the count of the at least one feature of the first region is greater than the first threshold.

15. The method of claim 11, wherein the identifying the at least one active region from the plurality of candidate first regions by clustering the plurality of candidate first regions includes:
  clustering the plurality of candidate first regions into at least one candidate active region;
  for each of the at least one candidate active region:
  determining a feature density of the candidate active region based on a number of candidate first regions included in the candidate active region and a number of first regions included in the candidate active region;
  comparing the feature density of the candidate active region with a second threshold; and identifying the candidate active region as the active region based on a comparison result that the feature density of the candidate active region is greater than the second threshold.

16. The method of claim 15, for each of the at least one candidate active region, further including:
   determining a total count of the at least one feature of the candidate active region based on the count of the at least one feature of each candidate first region included in the candidate active region;
   comparing the total count of the at least one feature of the candidate active region with a third threshold; and
   identifying the candidate active region as the active region based on a comparison result that the total count of the at least one feature of the candidate active region is greater than the third threshold.

17. The method of claim 16, further including:
   determining an active degree for each of the at least one active region;
   determining a group of active regions based on the active degree of each of the at least one active region, wherein the active degree corresponding to each of the active regions in the group is greater than any of active degrees of the at least one active region not included in the group; and
   directing the second video camera towards at least one second view according to the group of active regions.

18. The method of claim 17, wherein the directing the second video camera towards at least one second view according to the group of active regions includes:
   ranking the group of active regions based on the active degree of each active region included in the group;
   determining a sequence for the group of active regions based on the ranking; and
   directing the second video camera based on the sequence.

* * * * *